2,723,212
FLAME RETARDANT, WATER REPELLENT COMPOSITIONS AND ARTICLES TREATED THEREWITH

Ralph Aarons, Wilmington, Del., and Douglas Wilson, Gary, Ind., assignors to E. I. du Pont de Nemours and Company, Wilmington, Del., a corporation of Delaware No Drawing. Application September 9, 1953, Serial No. 379,298

13 Claims. (Cl. 117—137)

This invention relates to flame retardant, water repellent compositions, to processes employing these compositions to render flammable cellulosic and proteinaceous felted or woven materials flame retardant and water repellent, and to the resulting flame retardant water repellent materials.

More particularly, this invention is directed to aqueous solutions consisting essentially of ammonium sulfamate, a complex compound of the Werner type in which a trivalent chromium atom is coordinated with an acyclic carboxylic acido group having at least ten carbon atoms, dicyandiamide and boric acid.

The treatment of flammable organic materials to render them both flame retardant and water repellent, employing materials such as chlorinated hydrocarbons and waxes, has usually required two or more separate impregnation treatments.

The multi-step processes generally require careful control during the impregnation and drying steps. Often they necessitate the use of solvents with attendant difficulties with noxious fumes and solvent recovery. Or they require the use of hard-to-handle emulsified systems.

The organic materials subjected to dual or multiple impregnations often become stiff or boardy and possess a sticky or waxy feel. Frequently, they suffer degradation in respect to both color and tensile strength, particularly if exposed to high temperatures or severe aging conditions.

In carrying out a single step impregnation application, the attendant processing difficulties become so multiplied that those skilled in the art have heretofore avoided single step treatments in most instances.

We have now found that flammable organic materials, which are rapidly charred by mineral acids at temperatures substantially below the combustion temperature of the organic material, are rendered flame retardant and water repellent by single treatment with a composition consisting essentially of ammonium sulfamate, a chromium complex, dicyandiamide, boric acid, and water. And the treatment is effected without any of the difficulties encountered by prior art practices.

Our process for rendering organic materials flame retardant and water repellent comprises impregnating the material with our novel compositions by any standard dipping or spraying method and then drying the impregnated material by any conventional means at a temperature of from about 200 to about 220° F.

The compositions of our invention consist essentially of an aqueous solution of the following components in the ranges indicated:

| | Parts by weight |
|---|---|
| Ammonium sulfamate | 100 |
| A complex compound of the Werner type in which a trivalent nuclear chromium atom is coordinated with an acyclic carboxylic acido group having at least ten carbon atoms, as claimed in U. S. Patent 2,273,040 | * 0.3 to 1.8 |
| Dicyandiamide | 5 to 20 |
| Boric acid | 5 to 30 |

*Based on chromium content

The chromium complex can be conveniently combined in the compositions of our invention by adding it in the form of a stock solution in a water dispersible organic solvent. Any of the Werner type chrome complexes described and claimed in U. S. Patent 2,273,040 may be used to advantage in the composition of our invention. Complexes prepared from carboxylic acids containing 16 to 18 carbon atoms are preferred. It is particularly preferred to use a complex of stearic acid, namely, stearato chromic chloride. Chromium complexes of carboxylic acids in which the ratio of acido group/chromium/Cl is approximately 1/2/4 are also especially preferred.

It will be understood that a wetting agent may be added to the flame retardant-water repellent compositions of our invention. This is usually not desirable but when used the amount of wetting agent must be controlled so as not to impair water repellency. Typical of the wetting agents that can be employed are the polyethylene ether of a long chain fatty acid and the alkylated aryl polyether alcohols. Other wetting agents compatible with the compositions of the invention may be used.

Each of the components of the generic composition of the present invention has a specific function. Ammonium sulfamate acts as the flame retardant principle and has the added advantage of not affecting the hand of treated fabrics. Boric acid acts as the afterglow represser. Dicyandiamide acts as the stabilizer and protects treated materials against discoloration and tenderization upon exposure to high temperature or severe aging conditions. The Werner type chrome complex of an acyclic carboxylic acid having at least ten carbon atoms confers water repellency and resistance to moisture absorption, while not adversely affecting the hand or feel of treated fabrics.

Surprisingly, we have found that when the Werner chrome complex, ammonium sulfamate, boric acid, and dicyandiamide are combined in certain definite proportions a highly unexpected and unusual coaction takes place, such that flammable organic materials treated with flame retarding quantities of our combination develop improved flame retardancy, in respect to both degree of charring and afterglow, over that obtainable by treatment with a similar composition in which the Werner chrome complex is omitted.

The amounts of each of the components of the composition of this invention necessary to develop the aforesaid advantageous properties are critical.

For each 100 parts of ammonium sulfamate used in our composition, at least 0.3 part (based on chromium content) of a Werner type chromium complex are required to confer adequate water resistance upon the treated organic material; if more than 1.8 parts (based on chromium content) of the chrome complex are used for each 100 parts of ammonium sulfamate present in the composition, the unusual coaction which produces an improved flame retardant efficiency is essentially lost.

For each 100 parts of ammonium sulfamate used in the composition, at least 5 parts of boric acid are required to develop adequate afterglow protection; if more than 30 parts of boric acid are added per 100 parts of ammonium sulfamate in the composition, the water resistance properties are seriously affected.

At least 5 parts of dicyandiamide per 100 parts of ammonium sulfamate in the composition are required to achieve material protection against degradation and discoloration of treated organic substances. More than 20 parts of dicyandiamide per 100 parts ammonium sulfamate in the composition causes essential loss of the flame retardant coaction.

A unique characteristic of the composition of the present invention lies in the specificity of the composition.

In using the Werner type chromium complexes as the water repellent principle of our composition, no other substances have been found which may be substituted for the remaining components of the composition without causing either (1) instability of the aqueous composition, (2) a loss in the resistance of treated materials to degradation or discoloration when exposed to high temperatures or severe aging conditions, or (3) loss of the unusual coaction which develops an improved flame retardant efficiency.

The novel compositions of our invention may be made by dissolving the various components in water at approximately 25° C.

The process for treating materials with the composition of this invention so as to render them flame retardant and water repellent is not complex. The material to be treated, such as for instance, a cotton fabric or cellulosic paper, is impregnated by any convenient method, with our compositions, and then passed through squeeze rolls to remove excess solution. The wet fabric or paper is dried for a period of at least from one to two minutes at a temperature of not less than about 200° F. Any conventional textile or paper dryer is satisfactory for the purpose. The treated material may be dried at room temperature, but it will be understood that in such case the treated material should be subsequently heated to a temperature of 200–220° F. for a period of at least 1 minute.

The composition of our invention can also be prepared by dissolving the ammonium sulfamate, boric acid and dicyandiamide in water at about 25° C., then adding a polymerized solution of the Werner type chromium complex.

The polymerized solution of the chromium complex is prepared by adding the chromium complex to water which has been heated to a temperature between 90 and 100° C. and allowing the solution to stand for a period of from about three to five minutes. A convenient concentration at which the polymerization of the chromium complex is effected is about 10%, but this is not critical. At the end of the heating period, the polymerized chromium complex solution can be added directly to a cold solution of the remaining three components of the composition.

In treating organic materials with a composition of our invention prepared by using a polymerized solution of the Werner type complex, the drying step may be effected at room temperature conditions, that is, about 25° C. No after heating is required.

The preferred method of treatment to render material flame retardant and water repellent is to use a composition of the invention containing essentially unpolymerized chrome complex and to heat the treated material during or after the drying step to at least 200–220° F. for at least 1–2 minutes.

It will be understood that the concentration of impregnated flame retardant-water repellent which is necessary will vary with the degree of flame retardancy and water repellency desired and the relative combustibility of the material to which it is applied. In general, cellulosic materials such as, for instance, regenerated cellulose, cotton fabrics and paper will require from 4–10% of their weight of ammonium sulfamate to give products which will not propagate a flame and which ignite with difficulty at the point of contact with the igniting flame.

The compositions of the present invention confer upon non-volatile, flammable, polymeric organic materials such desirable properties as (1) high flame retardance, (2) satisfactory freedom from afterglow, (3) freedom from stiffness or boardiness, (4) freedom from a waxy or sticky feel, (5) good protection against discoloration or tenderization when exposed to high temperatures or prolonged aging conditions and (6) good water repellency and water resistance.

A special advantage of our compositions is that treated materials dried in the neighborhood of 220° F. do not suffer significant discoloration or tenderization if inadvertently overheated because of excessive drying time. For the same reason, the compositions of our invention are especially adaptable to high temperature, high speed processing conditions.

The invention may be used to advantage with any non-volatile, flammable, polymeric organic materials which are very rapidly charred by mineral acids at temperatures substantially below the combustion temperature of the organic material. Typical of the flammable materials which can be rendered flame retardant and water repellent by treatment with compositions of the invention are cellulosic materials, such as for instance, wood, wood fiber, straw, sawdust, wood flour, wood pulp, paper, viscose rayon, acetate rayon, cotton fibers, linen fibers, cotton textiles and cellophane. Other materials which can be rendered flame retardant and water resistant by the practice of our invention include naturally occurring proteinaceous fibers such as wool and silk, amylaceous substances such as starch, and such synthetic polymeric compounds as for instance polyvinyl alcohol, polyvinyl acetate and methyl cellulose.

In order to better understand the invention, reference should be made to the following illustrative examples:

EXAMPLE 1

This example illustrates the high degree of protection against the degradative effects of high temperature conferred upon materials which have been rendered flame retardant and water repellent by treatment with a composition of this invention containing 10 parts by weight of ammonium sulfamate, .12 part of stearato chromic chloride based on chromium content, 1 part by weight boric acid, 1 part by weight dicyandiamide, and 86 parts water.

Pieces of 50 lb. basis weight (24 x 36—500) kraft paper were treated with the composition to the retention indicated below by immersing the paper in the solution for a period of about 30 seconds, then passing the paper through tightly fitted rubber squeeze rolls to remove excess solution, and then drying on a drum dryer at a temperature of 100–105° C. for a period of about 1 to 2 minutes. The papers were then aged in an oven to 200° F. temperature for a period of 23 hours:

*Retention, per cent*

| | |
|---|---|
| Ammonium sulfamate | 10 |
| Werner type chromium complex of stearic acid added as a stock solution containing approximately 6.0% chromium [1] | 2 |
| Boric acid | 1 |
| Dicyandiamide | 1 |

[1] The chromium complex used in this example is a product sold commercially under the trade name of "Quilon" stearato chromic chloride. It is a stock solution in isopropanol containing approximately 6.0% chromium and in which complex the ratio of stearic acid/chromium/chloride is 1/2/4.

*Before aging*

| | |
|---|---|
| Flame test: | |
| Afterglow, seconds | 0 |
| Char length, inches | 3.0 |
| Tensile strength, lb. per in. width: | |
| Machine direction | 24.8 |
| Cross direction | 18.6 |
| pH of paper | 3.55 |

*After aging*

| | |
|---|---|
| Flame test: | |
| Afterglow, seconds | 0 |
| Char length, inches | 2.6 |
| Tensile strength, lb. per in. width: | |
| Machine direction | 26.8 |
| Cross direction | 17.4 |
| pH of paper | 3.7 |
| Discoloration | Slight |

The treated paper possessed very high water repellency both before and after aging.

EXAMPLE 2

This example illustrates the high protection against severe aging conditions conferred upon materials which have been rendered flame retardant and water repellent by treatment with a composition of the invention.

Pieces of 53 lb. basis weight (24 x 36—500) kraft paper were treated with the composition of Example 1 to the retention indicated below, by the same process described in Example 1, then given an accelerated aging test by exposure of the paper on alternate days to 160° F. in an oven and 95° F. at 95% R. H., for a total period of 20 days.

*Retention, per cent*

| | |
|---|---|
| Ammonium sulfamate | 10 |
| "Quilon" stearato chromic chloride (a solution of about 6% chromium content) | 2 |
| Boric acid | 1 |
| Dicyandiamide | 1 |

*Before aging*

| | |
|---|---|
| Tensile strength, lbs. per in. width: | |
|   Machine direction | 28.6 |
|   Cross direction | 15.9 |
| Elongation, per cent: | |
|   Machine direction | 3.4 |
|   Cross direction | 7.4 |
| Elmendorf tear strength, gms | 112 |

*After accelerated aging*

| | |
|---|---|
| Tensile strength, lbs. per in. width: | |
|   Machine direction | 29.1 |
|   Cross direction | 15.7 |
| Elongation, per cent: | |
|   Machine direction | 3.8 |
|   Cross direction | 5.3 |
| Elmendorf tear strength, gms | 82 |

The flame retardancy and water repellency of the paper were excellent both before and after accelerated aging.

EXAMPLE 3

A composition of our invention shown below as F is compared against other compositions to illustrate the unusual coaction which a composition of our invention develops and which results in an improvement in flame retardant efficiency as regards both degree of charring and afterglow.

Pieces of a cotton fabric, of plain weave, weighing about 8 ounces per square yard, were treated with the following formulae by immersing in the respective solutions following by passage through squeeze rolls to remove excess liquid and drum drying for about 3 minutes at 220° F. Samples were treated to retentions of 100% and 60% on the weight of the fabric, above retentions being based on the ammonium sulfamate content.

|  | Sample (in parts by weight) | | | | | | | |
|---|---|---|---|---|---|---|---|---|
|  | A | B | C | D | E | F | G | H |
| Ammonium sulfamate | 100 | 100 | 100 | 100 | 100 | 100 | 100 | 100 |
| "Quilon" stearato chromic chloride (a solution of about 6.0% chromium content) | | 10 | 10 | | 10 | | | 10 |
| Dicyandiamide | | | 10 | 10 | | | 10 | 10 |
| Boric Acid | | | | | 10 | 10 | 10 | 10 |
| Water | 900 | 890 | 880 | 890 | 880 | 890 | 880 | 870 |
| *Tests* | | | | | | | | |
| 100% Retention: | | | | | | | | |
|   Char length, inches | 2.2 | 2.2 | 2.1 | 1.9 | 2.1 | 2.1 | 1.8 | 1.7 |
|   Afterglow, min./sec | 0/25 | 2/55 | 2/3 | 1/41 | 0/28 | 0/7 | 0/11 | 0/19 |
| 60% Retention: | | | | | | | | |
|   Char length, inches | 2.3 | 2.4 | 2.4 | 2.2 | 2.5 | 2.6 | 2.3 | 2.1 |
|   Afterglow, min./sec | 1/49 | 3/7 | 6/0 | 2/37 | 0/55 | 0/49 | 1/37 | 0/19 |

Examination of the data, comparing B against A, shows that addition of "Quilon" stearato chromic chloride to ammonium sulfamate impairs the flame retardant efficiency by increasing the afterglow.

Comparing C against D shows that addition of "Quilon" stearato chromic chloride to an ammonium sulfamate dicyandiamide composition likewise impairs the flame retardant efficiency by increasing the afterglow.

Comparing E and F, it can be seen that addition of "Quilon" stearato chromic chloride had very little effect on the flame retardant efficiency.

Comparing H, a composition of the present invention, with G it can be seen that the "Quilon" stearato chromic chloride here, quite surprisingly, actually contributed to the flame retardant efficiency by materially reducing the afterglow.

Thus in combining "Quilon" stearato chromic chloride, ammonium sulfamate, dicyandiamide and boric acid in the proportions recited in this invention, the effects thereof are much more than additive and quite unpredictable. The Werner chrome complex in compositions of this invention actually contributes to the flame retardant efficiency by reducing afterglow, while if either the dicyandiamide or the boric acid or both are omitted, the Werner type complex either impairs the flame retardant efficiency of the composition or affects it very little.

We claim:

1. A composition consisting essentially of 100 parts by weight of ammonium sulfamate, from 5 to 20 parts by weight of dicyandiamide, from 5 to 30 parts by weight of boric acid, from 0.3 to 1.8 parts of a complex compound of the Werner type, in which a trivalent nuclear chromium atom is coordinated with an acyclic carboxylic acido group having at least 10 carbon atoms, by weight based on chromium content, and water.

2. A composition consisting essentially of 100 parts by weight of ammonium sulfamate, from 5 to 20 parts by weight of dicyandiamide, from 5 to 30 parts by weight of boric acid, from 0.3 to 1.8 parts of a complex compound of the Werner type, in which a trivalent nuclear chromium atom is coordinated with an acyclic carboxylic acido group having at least 10 carbon atoms, by weight based on chromium content, and water, the total parts being substantially equal to 1000.

3. An aqueous composition consisting essentially of 100 parts by weight of ammonium sulfamate, from 5 to 20 parts by weight of dicyandiamide, from 5 to 30 parts by weight of boric acid, from 0.3 to 1.8 parts of stearato chromic chloride based on chromium content, and water.

4. An aqueous composition consisting essentially of 100 parts by weight of ammonium sulfamate, from 7.5 to 12.5 parts by weight dicyandiamide, from 7.5 to 12.5 parts by weight boric acid, from 0.6 to 1.2 parts by weight stearato chromic chloride based on chromium content, the ratio of stearic acid to chromium to chlorine in said stearato chromic chloride being 1 to 2 to 4, and water.

5. In a process for preparing a composition of claim 1, the step of dissolving in from 820 to 885 parts of water at about 25° C. 100 parts by weight of ammonium sulfamate, from 5 to 20 parts by weight of dicyandiamide, from 5 to 30 parts by weight of boric acid and from 0.3 to 1.8 parts of a complex compound of the Werner type, in which a trivalent nuclear chromium atom is coordinated with an acyclic carboxylic acido group having at least 10 carbon atoms, by weight based on chromium content.

6. In a process for preparing a composition of claim 1, the steps of adding from 0.3 to 1.8 parts by weight based on chromium content of a complex compound of the Werner type in which a trivalent nuclear chromium atom is coordinated with an acyclic carboxylic acido group having at least 10 carbon atoms to water at a temperature of from 90 to 100° C., allowing the resulting solution to stand for a period of from about 3 to 5 minutes to polymerize the complex, then adding the polymerized Werner-type chromium complex to an aqueous solution at a temperature of about 25° C. and containing 100 parts by weight of ammonium sulfamate, from 5 to 20 parts by weight dicyandiamide, and from 5 to 30 parts by weight boric acid.

7. In a process for rendering a non-volatile, flammable polymeric organic material flame retardant and water repellent, the steps comprising impregnating the material with a composition of claim 1, and passing the impregnated material thru squeeze rolls to remove excess solution.

8. In a process for rendering a non-volatile, flammable polymeric organic material flame retardant and water repellent, the steps comprising impregnating the material with a composition of claim 1, wherein a polymerized solution of a Werner-type chromium complex is used, passing the impregnated material thru squeeze rolls to remove excess solution, and drying the material.

9. In a process for rendering a non-volatile, flammable polymeric organic material flame retardant and water repellent, the steps comprising impregnating the material with a composition of claim 1, passing the impregnated material thru squeeze rolls to remove excess solution, and subsequently heating the material for a period of at least 1 minute at a temperature of at least 200° F.

10. A polymeric organic material having flame retardant and water repellent properties and characterized by being impregnated with a composition consisting essentially of 100 parts by weight of ammonium sulfamate, from 5 to 20 parts by weight of dicyandiamide, from 5 to 30 parts by weight of boric acid, from 0.3 to 1.8 parts of a complex compound of the Werner type, in which a trivalent nuclear chromium atom is coordinated with an acyclic carboxylic acido group having at least 10 carbon atoms, by weight based on chromium content, and water.

11. An article of claim 10 wherein the polymeric organic material is cellulose.

12. An article of claim 10 wherein the polymeric organic material is paper.

13. An article of claim 10 wherein the polymeric organic material is cotton fabric.

References Cited in the file of this patent

UNITED STATES PATENTS

| | | |
|---|---|---|
| 2,273,040 | Iler | Feb. 17, 1942 |
| 2,424,831 | Klaber | July 29, 1947 |
| 2,539,558 | Studeny et al. | Jan. 30, 1951 |
| 2,557,993 | Oliver | June 26, 1951 |